US011746208B2

(12) United States Patent
Yue et al.

(10) Patent No.: US 11,746,208 B2
(45) Date of Patent: Sep. 5, 2023

(54) DYNAMIC NETWORKS FOR RECYCLING THERMOSET POLYMERS (71) Applicant: CASE WESTERN RESERVE UNIVERSITY, Cleveland, OH (US)

(72) Inventors: Liang Yue, Cleveland, OH (US); Vahab Solouki Bonab, Cleveland, OH (US); Ammar Patel, Cleveland, OH (US); Dian Yuan, Cleveland, OH (US); Vahid Karimkhani, Chapel Hill, NC (US); Ica Manas-Zloczower, Pepper Pike, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 161 days.

(21) Appl. No.: 17/082,092

(22) Filed: Oct. 28, 2020

(65) Prior Publication Data
US 2021/0054160 A1  Feb. 25, 2021

Related U.S. Application Data (63) Continuation of application No. 15/964,824, filed on Apr. 27, 2018, now Pat. No. 10,822,467.
(Continued)

(51) Int. Cl.
C08J 11/04 (2006.01)
C08J 3/205 (2006.01)
(Continued)

(52) U.S. Cl.
CPC ............ C08J 11/04 (2013.01); B01J 31/122 (2013.01); C08J 3/203 (2013.01); C08J 3/2053 (2013.01);
(Continued)

(58) Field of Classification Search
CPC . B01J 31/122; C08J 11/04; C08J 11/16; C08J 2300/24; C08J 2363/02;
(Continued)

(56) References Cited

U.S. PATENT DOCUMENTS 10,457,806 B2   10/2019   Groote
2018/0312657 A1  11/2018   Yue

OTHER PUBLICATIONS

Capelot et al, "Catalytic Control of the Vitrimer Glass Transition", ACS Macro Lett. 1 (7), 2012, pp. 789-792 (Year: 2012).*
(Continued)

Primary Examiner — Frances Tischler
(74) Attorney, Agent, or Firm — McDonald Hopkins LLC (57) ABSTRACT Methods for recycling thermoset polymers, particularly by changing them into dynamic networks with the use of an appropriate catalyst solution which transforms the thermoset polymer into a vitrimer-like composition. The methods include the step of swelling a crosslinked thermoset polymer in a solution including a catalyst, whereby the catalyst diffuses into the thermoset polymer, in particular into the thermoset network. Upon removal of the liquid portion of the solution, such as solvent, the catalyst facilitates the occurrence of exchange reactions at elevated temperatures, rendering the system a dynamic network. The vitrimerized composition having the thermoset polymer and catalyst is recyclable and processable and thus suitable for many end uses.

9 Claims, 7 Drawing Sheets

Related U.S. Application Data (60) Provisional application No. 62/633,408, filed on Feb. 21, 2018, provisional application No. 62/491,489, filed on Apr. 28, 2017.

(51) Int. Cl.
  *C08J 3/20* (2006.01)
  *B01J 31/12* (2006.01)
  *C08K 3/04* (2006.01)
  *C08J 11/16* (2006.01)

(52) U.S. Cl.
  CPC .............. *C08J 11/16* (2013.01); *C08K 3/041* (2017.05); *C08J 2300/24* (2013.01); *C08J 2363/02* (2013.01); *C08J 2375/06* (2013.01)

(58) Field of Classification Search
  CPC ...... C08J 2375/06; C08J 3/203; C08J 3/2053; C08K 3/041; C08L 63/00; C08L 75/04; Y02P 20/584; Y02W 30/62
  See application file for complete search history.

(56) References Cited

OTHER PUBLICATIONS

Liang Yue, "Vitrimerization: A Novel Concept to Reprocess and Recycle Thermoset Waste via Dynamic Chemistry", Global Challenges, WILEY-VCH Verlag GmbH & Co. KGaA, 2019.

Damien Montarnal, et al., "Silica-like Malleable Materials from Permanent Organic Networks", SCIENCE, vol. 334, pp. 965-967, Nov. 18, 2011 (www.sciencemag.org).

\* cited by examiner

DYNAMIC NETWORKS FOR RECYCLING THERMOSET POLYMERS

CROSS-REFERENCE TO RELATED APPLICATION

This application is a continuation of U.S. patent application Ser. No. 15/964,824 filed on Apr. 27, 2018 and entitled, "DYNAMIC NETWORKS FOR RECYCLING THERMOSET POLYMERS" and now granted as U.S. Pat. No. 10,822,467; which claims priority to both U.S. Provisional Patent Application No. 62/633,408 filed on Feb. 21, 2018, and U.S. Provisional Patent Application No. 62/491,489 filed on Apr. 28, 2017; each of which are incorporated herein in their entireties.

STATEMENT REGARDING FEDERALLY SPONSORED RESEARCH OR DEVELOPMENT

This invention was made with Government support under contract 1243313 awarded by the National Science Foundation. The Government has certain rights in the invention.

FIELD OF THE INVENTION

The present invention relates to methods for recycling thermoset polymers, particularly by changing them into dynamic networks with the use of an appropriate catalyst solution which transforms the thermoset polymer into a vitrimer-like composition. The methods include the step of swelling a crosslinked thermoset polymer in a solution including a catalyst, whereby the catalyst diffuses into the thermoset polymer, in particular into the thermoset network. Upon removal of the liquid portion of the solution, such as solvent, the catalyst facilitates the occurrence of exchange reactions at elevated temperatures, rendering the system a dynamic network. The vitrimerized composition comprising the thermoset polymer and catalyst is recyclable and healable and thus suitable for many end uses.

BACKGROUND OF THE INVENTION

Thermosets are covalently cross-linked networks that, unlike thermoplastics cannot be reprocessed by melting or dissolution in any solvents. These networks can exhibit a glass transition temperature ($T_g$) lower than the designed application service temperature (elastomer/rubber) or higher than the service temperature (thermoset resins). Thermoset rubbers find applications in the automotive industry (interiors, bumpers), biomedical devices, bedding, furniture, packaging, gaskets, O-rings and so on.

Usually thermoset resins exhibit significant benefits in comparison with thermoplastics exhibiting dimensional stability, high mechanical properties, high thermal/creep/and chemical resistance, durability. This class of polymers maintain their structural strength, thermal and electrical resistance characteristics during prolonged use. Thermosets find many industrial uses as coatings, adhesives but also in fiber reinforced Thermosets find many industrial uses as coatings, adhesives but also in fiber reinforced composites for many high-tech applications. Composites high stiffness and strength in combination with their light weight make them play a vital role in the clean energy production (e.g. wind turbine blades, hydrokinetic power generation, support structures for solar systems and their encapsulations, and geothermal energy production) manufacturing of lighter vehicles (automotive, airplanes, trains, boats and aerospace) for reduced fuel consumption. There are many other applications requiring high structural strength and durability, thermal and corrosion resistance, such as structural materials for buildings, pipelines, industrial equipment and/or their components for instance heat exchangers, light-emitting diode lenses, fly-wheels for electricity grid stability, containers, or off-shore structures in which composite materials are the material of choice.

Despite the great features of thermosets, they are typically produced in relatively small quantities and are expensive. Their main advantage, which is retaining a lasting and intractable three-dimensional structure, creates also a crucial disadvantage since they cannot be recycled or reprocessed.

A very interesting strategy to induce re-formability and healing in chemically cross-linked polymer networks is by using exchangeable chemical bonds that will lead to a dynamic cross-linked network. Polymeric systems containing such exchangeable bonds are covalent adaptable networks (CANs). Depending on the exchange mechanism, CANs can be classified to two different categories. The first category comprises networks where the exchange mechanism of crosslinks is dissociative. For such networks, most of the cross-links break under certain conditions (temperature, UV-light exposure, pH) and re-form again with a change in the conditions. These type of adaptive networks show a sudden and significant decrease in the viscosity, with breaking the cross-linking bonds.

In the second category, the mechanism of crosslinking is associative and a crosslinking bond does not break until a new bond forms, which makes the network permanent and dynamic.

Vitrimers are polymeric associative CANs that have permanent networks and demonstrate a gradual viscosity decrease upon heating, which is a distinctive character of vitreous silica. By definition, vitrimers are polymeric networks made with covalent crosslinking. The crosslinking bonds of such networks have an associative nature which results in the ability of material to change its topology via exchange reactions. These reactions are triggered by heat which causes a gradual decrease in system viscosity with increasing temperature and provides malleability to the network. The viscosity of vitrimers is governed by the chemical exchange reaction at elevated temperatures and like silica and unlike dissociative networks and thermoplastics, decreases gradually. Vitrimers maintain permanent network at all temperatures until degradation, and they can swell but not dissolve in specific solvents. However, swelling ratios are higher for these networks in comparison with the non-dynamic ones.

Due to importance of polymer recycling, scientists are interested in the concept of designing materials based on cradle-to-cradle life cycle. Dynamic networks offer the opportunity to design materials considering the cradle-to-cradle concept. However, such systems do not exhibit properties at par with thermosets and are sometimes prone to early degradation. Application of such networks is restricted at high temperatures.

SUMMARY OF THE INVENTION

Reprocessing of existing thermoset waste is presented. Unrecyclable thermoset materials are reprocessed using associative dynamic bonding. The developed recycling methodology relies on swelling the thermoset network into a solution of a catalyst which enables transesterification reactions characteristic of vitrimer chemistry allowing dynamic bond exchange between ester and hydroxyl groups within the thermoset network. Thermal and mechanical properties for recycled polyurethane and epoxy networks are described along with a strategy to maintain the properties of recycled materials. The developed methodology promises recycling and reprocessing of previously thought intractable materials. Moreover, processability of vitrimerized thermosets with common thermoplastic manufacturing methods opens up the possibility of tuning recycled networks by adding nanoparticles. This flexibility keeps the application window of recycled thermosets very broad.

In view of the above, the present invention provides recyclable thermoset polymers and methods for producing recyclable thermoset polymers.

Accordingly, one aspect of the present invention relates to a vitrimer-like composition, comprising a crosslinked polymer and a catalyst infused in a network comprising the crosslinked polymer, wherein the composition is a dynamic network.

A further aspect of the invention relates to a method for producing a recyclable thermoset composition, comprising the steps of: obtaining a crosslinked polymer; contacting the crosslinked polymer with a solution comprising a catalyst and a liquid such that the catalyst becomes infused in at least a portion of the crosslinked polymer; and removing the liquid from the crosslinked polymer and solution.

BRIEF DESCRIPTION OF THE DRAWINGS

The invention will be better understood and other features and advantages will become apparent by reading the detailed description of the invention, taken together with the drawings, wherein:

FIGS. 5(a) and (b) illustrates representative tensile curves for the epoxy and PU system respectively. (b) also shows the effect of a second recycling on the mechanical properties (c) stress relaxation behavior for the neat, vitrimerized and vitrimer epoxy system. (d) illustrates thermal stability and decomposition behavior of samples.

DETAILED DESCRIPTION OF THE INVENTION

Methods for recycling crosslinked thermoset polymers are disclosed herein. The method recycles the thermosets by changing them into dynamic networks with the use of an appropriate catalyst solution which results in a vitrimer-like composition. The catalyst facilitates exchange reactions which can take place at elevated temperatures, rendering the vitrimerized composition system a dynamic network. Importantly, the crosslinked thermoset polymer becomes recyclable and healable utilizing the methods of the present invention.

Through the present invention, a thermoset material is provided that is able to be used for its intended application and thereafter can be converted into a vitrimer-like form that can be utilized in a second application.

Nanoparticles are utilized in some embodiments in order to tune the properties of the recycled thermosets.

Thermoset Polymers

The present invention includes at least one crosslinked thermoset polymer in order to form a vitrimer composition. Various crosslinked thermoset polymers can be utilized. For example, crosslinked thermoset polymers include, but are not limited to, polyester based polyurethane, epoxy, polyesters and any crosslinked network which has ester groups on the backbone of the polymer as well as available OH groups on the structure.

Catalysts

The vitrimer-like compositions of the present invention also include a catalyst that has the ability to facilitate exchange reactions of the crosslinked thermoset polymer. The catalyst must also be able to diffuse into the network of the crosslinked thermoset polymer.

Generally, the catalyst can be chosen from metal salts of zinc, tin, magnesium, cobalt, calcium, titanium and zirconium. A catalyst with lower activation energy is preferred since it leads to faster transesterification kinetics. The catalyst may also be chosen from catalysts of organic nature, such as but not limited to, benzyldimethylamide, and benzyltrimethylammonium chloride. The catalyst should be chosen such that it should be soluble in the liquid or solvent which is used for polymer swelling and have a sufficiently high degradation temperature.

That said, suitable catalysts include tin(II) 2-ethylhexanoate, 1,5,7-triazabicyclo[4.4.0]dec-5-ene (TBD), zinc(II)acetate ($Zn(OAc)_2$), triphenylphosphine ($PPh_3$), dibutyltin bis(2-ethylhexanoate), dibutyltin diacetate, dibutyltin dilaurate, dibutyltin bis(2,4-pentanedionate), titanium 2-ethylhexanoate, monobutyltin oxide, and zinc octoate.

In one embodiment of the invention, the catalyst is utilized in an amount sufficient to produce a vitrimer having desired properties. For example, in one embodiment, at least 2 wt. % catalyst based on the thermoset polymer weight is utilized.

A catalyst concentration of about 10 wt. % in a suitable solvent is preferred in some embodiments.

Catalyst Solution Liquid

As described herein, the catalyst is placed in a liquid to form a catalyst solution and the solution is contacted with the crosslinked thermoset polymer in order to infuse the catalyst into the polymer. The liquid utilized preferably has one or more of the following characteristics: the ability to dissolve the catalyst, and the ability to swell the polymer to allow infusion of the catalyst into the polymer network. Preferably, the liquid has a low evaporation temperature. In some embodiments the catalyst solution liquid comprises 10 wt. % or 20 wt. % or more of the catalyst. However, lower amounts can be utilized in other embodiments.

Examples of suitable liquids include, but are not limited to, dichloromethane (DCM), Tetrahydrofuran (THF), N,N-Dimethylformamide (DMF), and Dimethylsulfoxide (DMSO). Basically, the liquid, i.e. solvent should be able to dissolve the catalyst being used as well as swell the polymer. Thus, the solvent of choice can change with the polymer type and catalyst.

Nanoparticles

In various embodiments of the present invention, the compositions of recycled thermosets can have nanoparticles incorporated therein. Carbon nanostructures are preferred in one embodiment. Similar nanoparticles like such as zinc oxide, titanium dioxide, nanoclay, carbon black, graphene oxide can be used. Mixtures of nanoparticles are contemplated. The nanoparticles, when utilized, are preset in a weight concentration up to about 30 wt % based on the total weight of the composition. Micron sized fillers can be used as well. Any filler that can be compounded using conventional mixing elements like an extruder can be incorporated.

EXAMPLES

Vitrimerized Polyurethane

Materials

Crosslinked polyurethane (PU) was synthesized by polymerizing polycaprolactone triol (Mw=900 g/mol) with 1,4-phenylene diisocyanate (PPDI). 10 g of polyol was degassed under vacuum at 80° C. overnight then transferred into a sealed three neck reactor under nitrogen and 40 ml of DCM was added to the reactor and stirred to dissolve the polyol. The PPDI was mixed with the same amount of DCM. The PPDI solution was added to the polyol solution at 40° C. and stirred rigorously for 3 mins. The mixture was cast on a Teflon® plate and the solvent (DCM) was let to evaporate at room temperature under nitrogen flow for 48 hours. The resulting films were placed in vacuum oven at 80° C. for 24 hours to eliminate any traces of solvent from the PU.

Crosslinked PU was cut into small pieces and added to a solution of 20-40 wt % tin(II) 2-ethylhexanoate (Sn (Oct)$_2$) in dichloromethane (DCM). The mixture was stirred for 72 hours to ensure that the PU was completely swollen and the catalyst has infused into the PU network. PU pieces were separated from solution by sieving and then placed in vacuum oven for 24 hours at 25° C. PU pieces were then washed with isopropyl alcohol in order to remove any remaining catalyst on the PU surfaces and then were placed in vacuum oven for another 24 hrs at 80° C. to remove any solvent from the system. The dried PU pieces were placed between Teflon sheets and pressed at 180° C. for 20 mins and formed a clear defect free film. Dog-bone samples were cut from this film and were used for mechanical analysis.

Methods

Uniaxial tensile tests were carried out at room temperature with a Zwick/Roell (Model Z0.5) with load cell of 100N on at least 4 samples at an extension rate of 10 mm/min. Samples had dumbbell shape and were cut from films of PU which were prepared by compression molding.

Results

Figure 1:
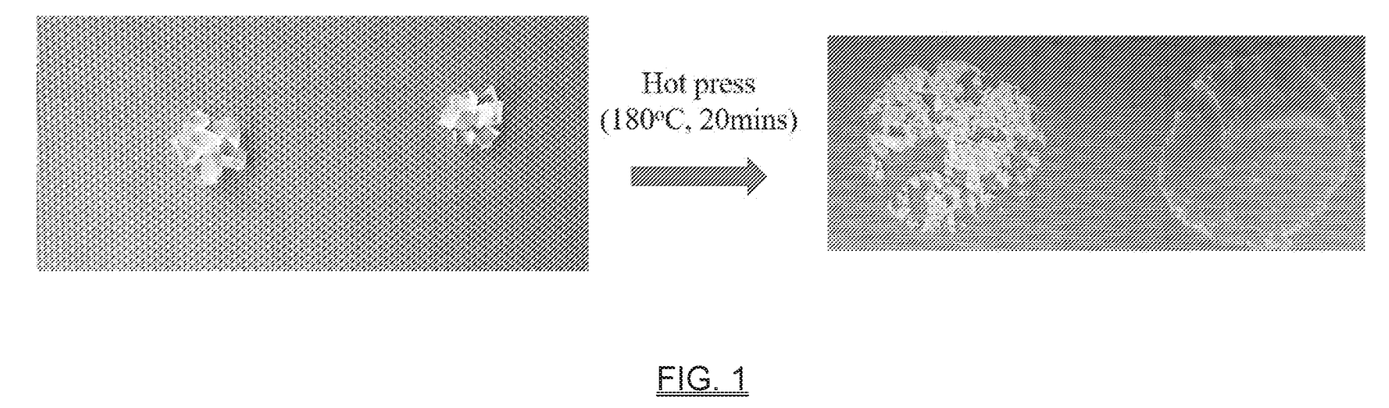
FIG. 1 illustrates, left side, polyurethane pieces and vitrimerized polyurethane pieces comprising a crosslinked polymer and a catalyst to the immediate right thereof, wherein the vitrimerized composition exhibits tinges of yellow due to incorporation of the catalyst and, right side, an image of the respective pieces after pressing at 180° C. for 20 minutes, wherein it is clearly observed that the untreated polyurethane is in a powder-like form and the vitrimerized composition has formed a film.

In order to prove the concept that we are able to recycle crosslinked PU rubber, we attempt to reshape small cut pieces into a film using hot press. As FIG. 1 shows, original PU pieces are transparent in color and the recycled PU has tinges of yellow due to incorporation of the catalyst. The color change proves that we have successfully infuse the catalyst into the PU network. After the hot press we observe that the untreated PU breaks into powder whereas the recycled/treated PU flows and forms a good quality film.

Figure 2:
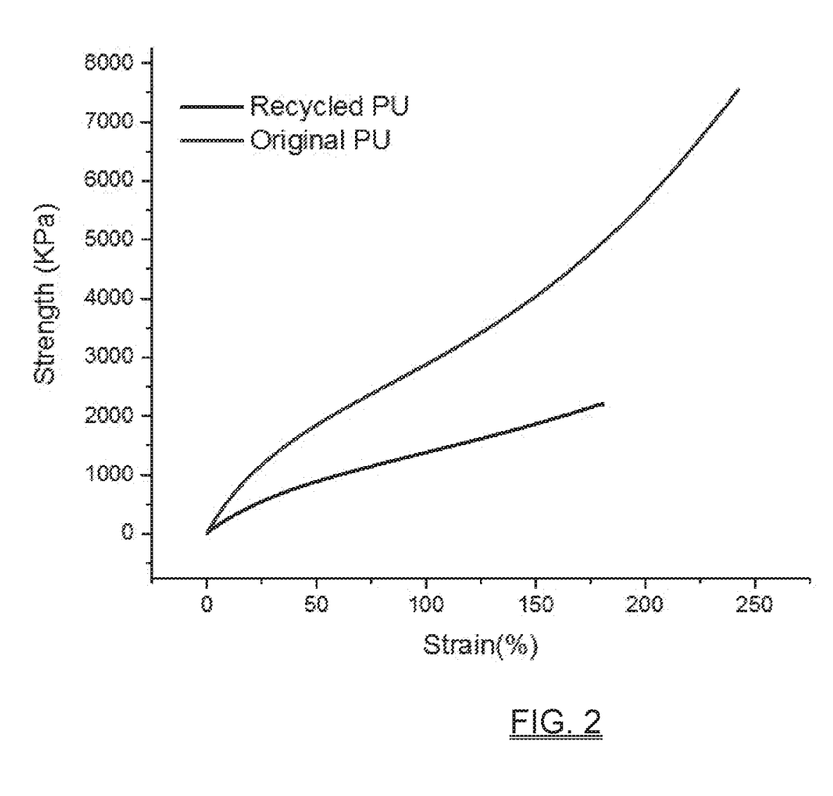
FIG. 2 illustrates, left side, mechanical performance of recycled (vitrimerized) polyurethane and original, untreated polyurethane and, on the right, the exceptional extensibility of vitrimerized polyurethane is shown.
Figure 3:
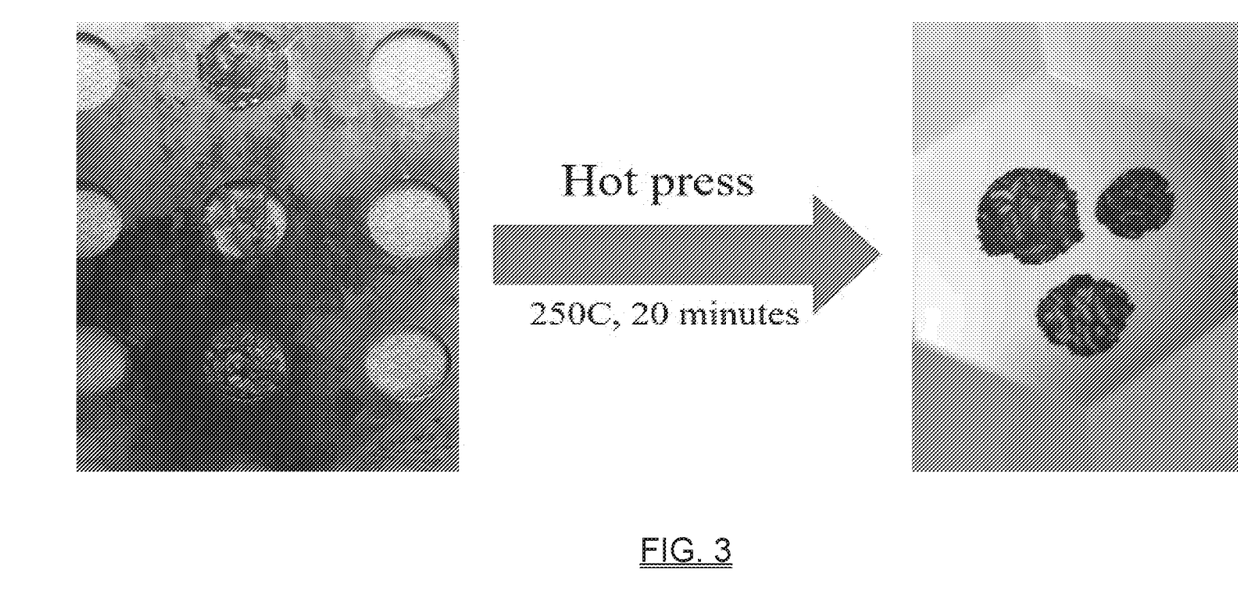
FIG. 3 illustrates, left side, vitrimerized epoxy pieces comprising a crosslinked polymer and a catalyst after solvent penetration, right side, an image of the pieces after pressing at 250° C. for 20 minutes, wherein it is clearly observed that the vitrimerized composition has formed a film.

The mechanical performance of recycled PU was investigated and compared to the mechanical properties of neat PU. Those properties are shown in FIG. 2 and summarized in table 1. It can be seen that after recycling 32% of modulus and 57% of ultimate strength are recovered and interestingly the extensibility of PU (elongation at break) has increased by 92%. Significant extensibility of the recycled PU is also seen in FIG. 2 which shows that the recycled PU can extend more than 5 times of its original length. Results obtained from the mechanical analysis show that recycling is effective and successful.

TABLE 1

Results obtained from tensile experiments

| Sample name | Modulus (MPa) | Strength (MPa) | Elongation at break (%) |
|---|---|---|---|
| PU | 5.637 ± 0.48 | 10.7 ± 2.79 | 270 ± 31 |
| Recycled PU | 1.811 ± 0.14 | 6.13 | 520 |

Vitrimerized Epoxy 1

The epoxy DGEBA (diglycidyl ether of Bisphenol-A) and both the catalysts tin(II) 2-ethylhexanoate and zinc acetylacetonate were purchased from Sigma Aldrich and used as received. The fatty acid (Pripol™ 1040) was obtained from Croda Inc. and used as received.

The transesterification reaction that we are exploiting in this work requires the presence of hydroxyl and ester groups. Hydroxyl groups are readily available in any epoxy sample as ring opening of the oxirane molecule results in the formation of hydroxyl groups. The choice of hardener dictates the presence or absence of the ester groups. To this effect, we chose fatty acid curing agents which result in ester groups being formed upon curing.

DGEBA and Pripol™ 1040 were hand mixed together using a glass rod in the weight ratio of epoxy:hardener=1:1.7 (the stoichiometry between the epoxy group to COOH is 1:1). The premixed samples were poured into a silicon mold and cured in two stages. The mixture was first cured at 80° C. until gel and 160° C. for 6 hours. After the samples were completely cured, they were cut into small pieces with dimensions of approximately 2 mm*2 mm*3 mm.

The catalyst tin(II) 2-ethylhexanoate which is a liquid at room temperature was dissolved in 3 solvents namely dimethylformamide (DMF), tetrahydrofuran (THF) and dichloromethane (DCM). 28 wt % of this catalyst solution was prepared in ~18 ml of solvent. Approximately 200-300 mg of the cut epoxy sample pieces were then immersed into each of these catalyst solvent solutions and left to stir at room temperature for 72 hours. 20 wt. % of the catalyst zinc acetylacetonate which is in the form of powder at room temperature was melted and dissolved in ~18 ml of DMF at 130° C. 200-300 mg of the cut epoxy samples were immersed into this catalyst solution and left in the oven at 130° C. for 72 hours.

After 72 hours, the 4 different samples were dried at 80° C. for 48 hours following which, the dried samples were washed with ethanol and then dried for another 12 hours at 80° C. The washed and dried epoxy sample pieces were then hot pressed at 250° C. for 20 minutes. A control sample that was not immersed into any catalyst solution was also hot pressed at 250° C. for 20 minutes.

Samples without any catalyst penetration i.e. the control sample remained as discrete pieces irrespective of hot pressing. All the samples which underwent the above mentioned process of catalyst penetration formed uniform thin films.

Vitrimerized Epoxy 2

Epoxy networks were synthesized using DGEBA (Diglycidyl ether of Bisphenol A) and Glutaric anhydride. The reactants were hand mixed together using a glass rod such that the ratio of [epoxy groups]:[anhydride groups] is 1:1. An imidazole catalyst was added at 1 wt % with respect to DGEBA to accelerate the reaction. The mixture was poured into a mold and cured at 80° C. and then 160° C. for 8 hours each.

Tensile tests for the epoxy system were conducted on a Zwick/Roell with a load cell of 500N at an extension rate of 1 mm/min. Samples were rectangular shaped and were obtained from the minilab in a process that will be explained later herein.

TGA: Thermal decomposition tests were run on samples on a Q500 TA instruments machine under N2 flow. Samples were ramped upto 700° C. at 10° C. per minute.

Stress Relaxation: The Ares G2 Rheometer was used to measure the stress relaxation behavior of all samples. Samples were studied in parallel plate geometry at a temperature of 200° C. Samples were subjected to a strain percentage following which the relaxation in storage modulus was observed with time. Care was taken to ensure that the strain values were within the viscoelastic regimes of all samples.

Results and Discussion

The transesterification reaction was selected as a model chemistry for vitrimerization in this research because of its importance and abundance in many thermoset systems. Any thermoset material that has ester groups and freely available hydroxyl groups can be infused with a catalyst that supports transesterification and thereby be converted into a vitrimer-like material. In this research the effect of vitrimerization on recyclability of epoxy and polyurethane as two widely used thermoset materials has been shown.

The catalyst employed in the examples, Tin (II) 2-ethylhexanoate $(Sn(Oct)_2)$ was chosen for its high catalytic activity in transesterification reactions as well as its high stability in most media.

Figure 4:
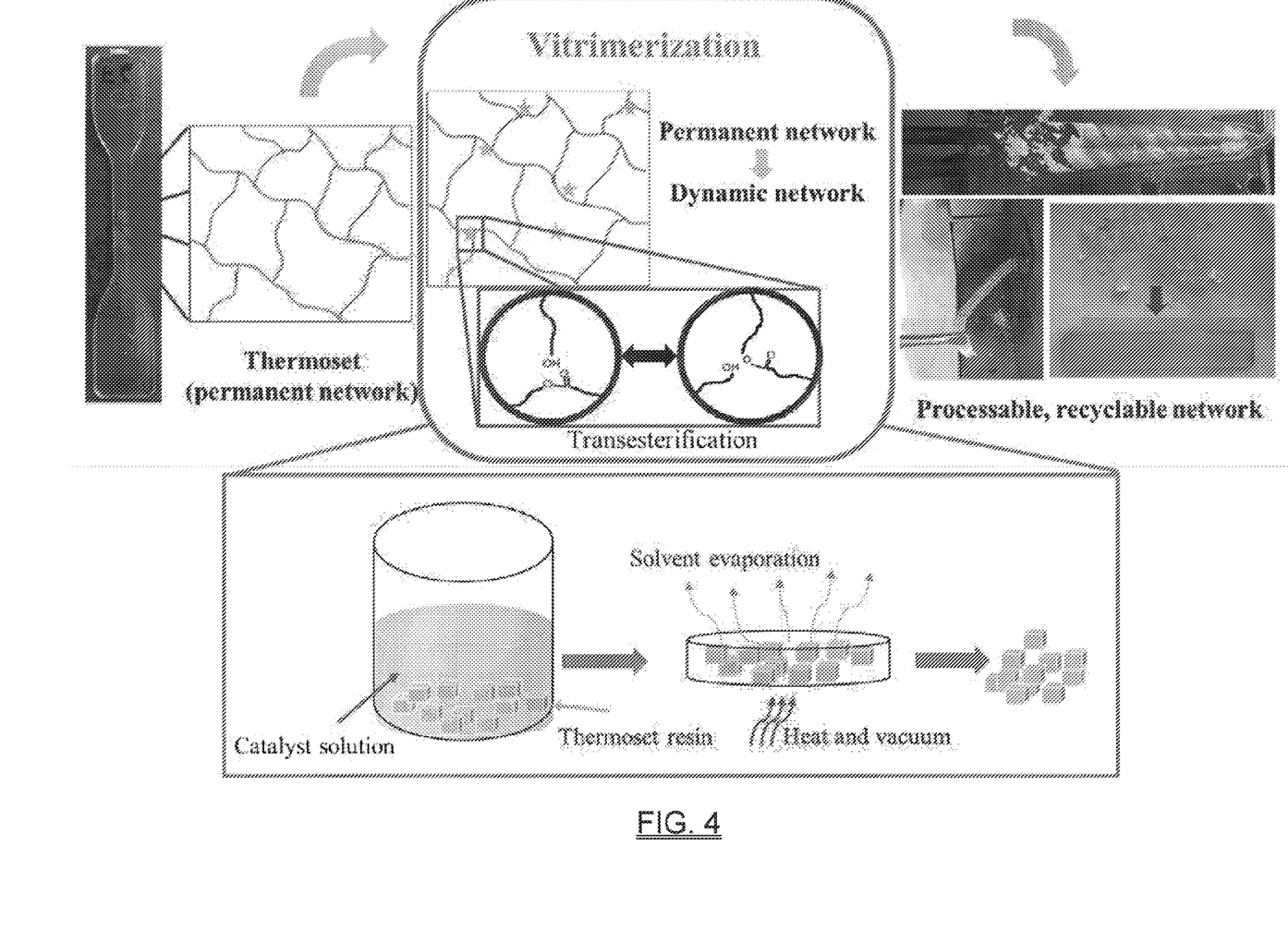
FIG. 4 is an overview of the process wherein a permanent thermoset network can be extruded, injection molded and compression molded after vitrimerization.

The Vitrimerization process: The infusion of catalyst into the sample to make a vitrimerized material is also dependent on temperature. The infusion was much more successful if it was carried out at a temperature above the Tg of the sample. It is believed that the solvent swelling at temperatures higher than network's Tg facilitated the diffusion of the catalyst molecules into the thermoset network. FIG. 4 shows a schematic of the vitrimerization process. In general, a 10 wt % catalyst solution (solvent varied based on temperature of infusion) was prepared, and small pieces of the thermoset samples (approximately 2 mm*2 mm*2 mm) were immersed into the solution for 48 hours. The samples were then washed with ethanol to remove the catalyst from the surface and dried in a vacuum oven for 12-24 hours. More specifically, the infusion for PU (having a Tg of ~-7° C.) was successful at room temperature using Dichloromethane (DCM) as the solvent. The samples after infusion and washing with ethanol were dried at 80° C. for 24 hours. The epoxy sample which had a Tg of 95° C. was infused with the catalyst at 140° C., since its glassy behavior at room temperature would prevent significant catalyst diffusion.

Logically, a high temperature boiling point solvent Dimethylformamide (DMF) replaced DCM for the hard network infusion. The infusion was carried out for 48 hours, following which the samples were washed with ethanol and dried at 140° C. in a vacuum oven for 24 hours.

Processing of the Vitrimerized Samples:

The infused or 'vitrimerized' samples were processed by compression molding and extrusion. FIG. 4 shows samples made from each of these processes. In the case of compression molding, preheating time, pressing time and temperature played a role in determining final film quality. PU was processed at 200° C. with 5 minutes of preheating time and 5 minutes of pressing at a pressure of 5 metric tons. A higher temperature resulted in the onset of degradation of the PU material. The epoxy samples were hot pressed at 250° C. with 20 minutes of preheating time and then pressed for 15 minutes at a pressure of 5 metric tons. Temperatures less than 250° C. resulted in incomplete films.

Extruded samples were obtained by feeding the vitrimerized material into the hopper of a twin screw counter rotating minilab operating at a temperature of 205° C. and at an RPM of 15.

Besides extrusion, some samples in the minilab were also forced into a mold to form rectangular shaped samples as can be seen in FIG. 4, a process akin to injection molding.

Figure 5:
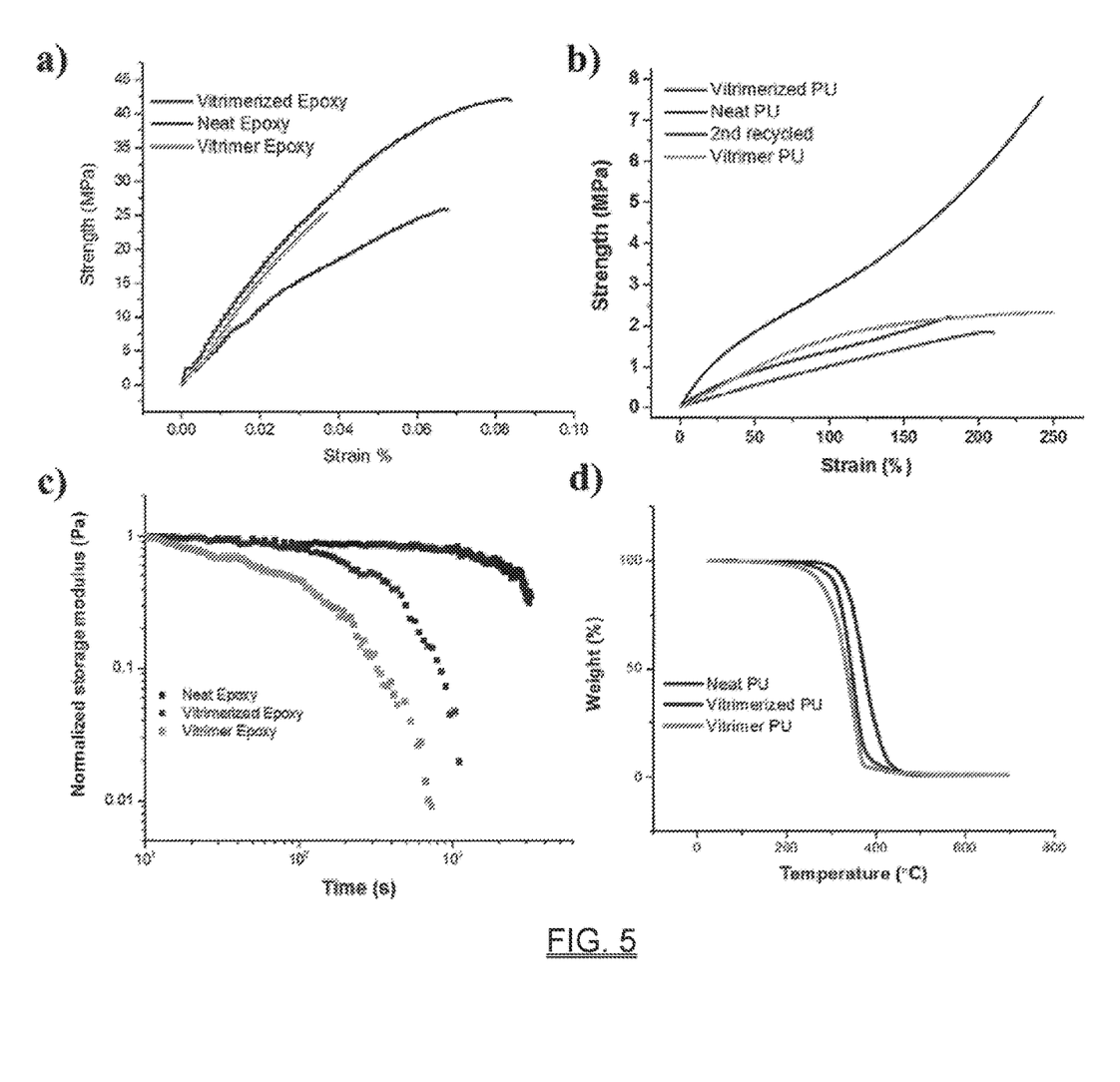

Properties of the vitrimerized samples: Dog bone shaped PU thin films obtained from hot pressing were compared for mechanical testing with their neat counterparts, i.e. PU samples which were not vitrimerized. Rectangular shaped samples obtained from the minilab were used for mechanical testing in the case of the epoxy system. Those properties are shown in FIGS. 5(a) and (b) and summarized in the tables below.

TABLE a

Mechanical properties comparing neat, vitrimer and vitrimerized samples for PU system

| Samples | Strength (MPa) | Modulus (MPa) | Elongation at break (%) |
|---|---|---|---|
| Neat | 7.84 ± 0.85 | 5.56 ± 0.46 | 246 ± 37.1 |
| Vitrimerized 1$^{st}$ recycle | 2.35 ± 0.22 | 2.43 ± 0.06 | 192 ± 16.9 |
| Vitrimer 1 wt % | 2.46 ± 0.277 | 2.41 ± 0.16 | 195 ± 19 |
| Vitrimer 5 wt % | 2.37 ± 0.107 | 1.791 ± 0.100 | 261 ± 40 |
| Vitrimer 10 wt % | 3.227 ± 0.223 | 2.481 ± 0.063 | 241 ± 14 |

TABLE b

Mechanical properties comparing neat, vitrimer and vitrimerized samples for epoxy system

| Samples | Strength (MPa) | Modulus (MPa) | Elongation at break (%) |
|---|---|---|---|
| Neat | 40 ± 1.41 | 802 ± 100.41 | 8 ± 0.1 |
| Vitrimerized 1$^{st}$ recycle | 26 | 600 | 6.8 |
| Vitrimer 5 wt % | 22.13 ± 5.2 | 918 ± 11.16 | 3.8 ± 0.03 |

TABLE c

Mechanical properties of a PU system with multiple recycling and addition of nanofillers

| Samples | Strength (MPa) | Modulus (MPa) | Elongation at break (%) |
|---|---|---|---|
| Neat | 7.84 ± 0.84 | 5.55 ± 0.45 | 246 ± 37.1 |
| Recycled (1$^{st}$) | 2.35 ± 0.22 | 2.43 ± 0.06 | 192 ± 16.9 |
| Recycled (2$^{nd}$) | 2.10 ± 0.22 | 1.22 ± 0.22 | 259 ± 52 |
| Recycled 10 wt. % CNS | 7.251 ± 1.532 | 13.48 ± 2.88 | 67.5 ± 28.6 |

It can be seen that after recycling, 44% of modulus, 30% of ultimate strength and 78% of extensibility for PU could be recovered. In the case of the epoxy system, 73.5% of modulus, 63% of ultimate strength and 82% of extensibility were recovered.

Figure 7:
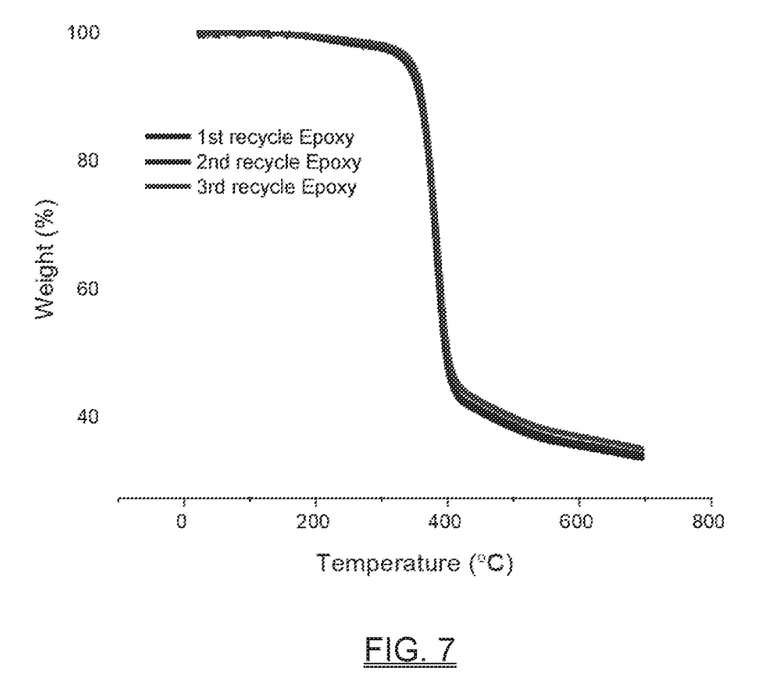
FIG. 7 illustrates the effect of multiple recycling cycles on thermal decomposition temperatures of a material.

The effect of multiple recycling on vitrimerized samples was also investigated as can be seen in FIG. 5(b) and FIG. 7. Previously thought to be unrecyclable PU waste, the vitrimerized samples could now be reprocessed up to 2 times. The third recycling resulted in a paste unable to form a film of any substantial strength. In the 2$^{nd}$ recycling process there was a 10% decrease in ultimate tensile strength and a 50% decrease in modulus, while the elongation at break increased by 35% by comparison with the first recycle. The multiple recycling did not however have any effect of the thermal decomposition temperatures of the material as is observed in FIG. 7.

Since vitrimerization also allows for the processing of a thermoset just like a thermoplastic, it affords the unique advantage of incorporating fillers into the thermoset network during recycling to further increase mechanical properties.

Figure 6:
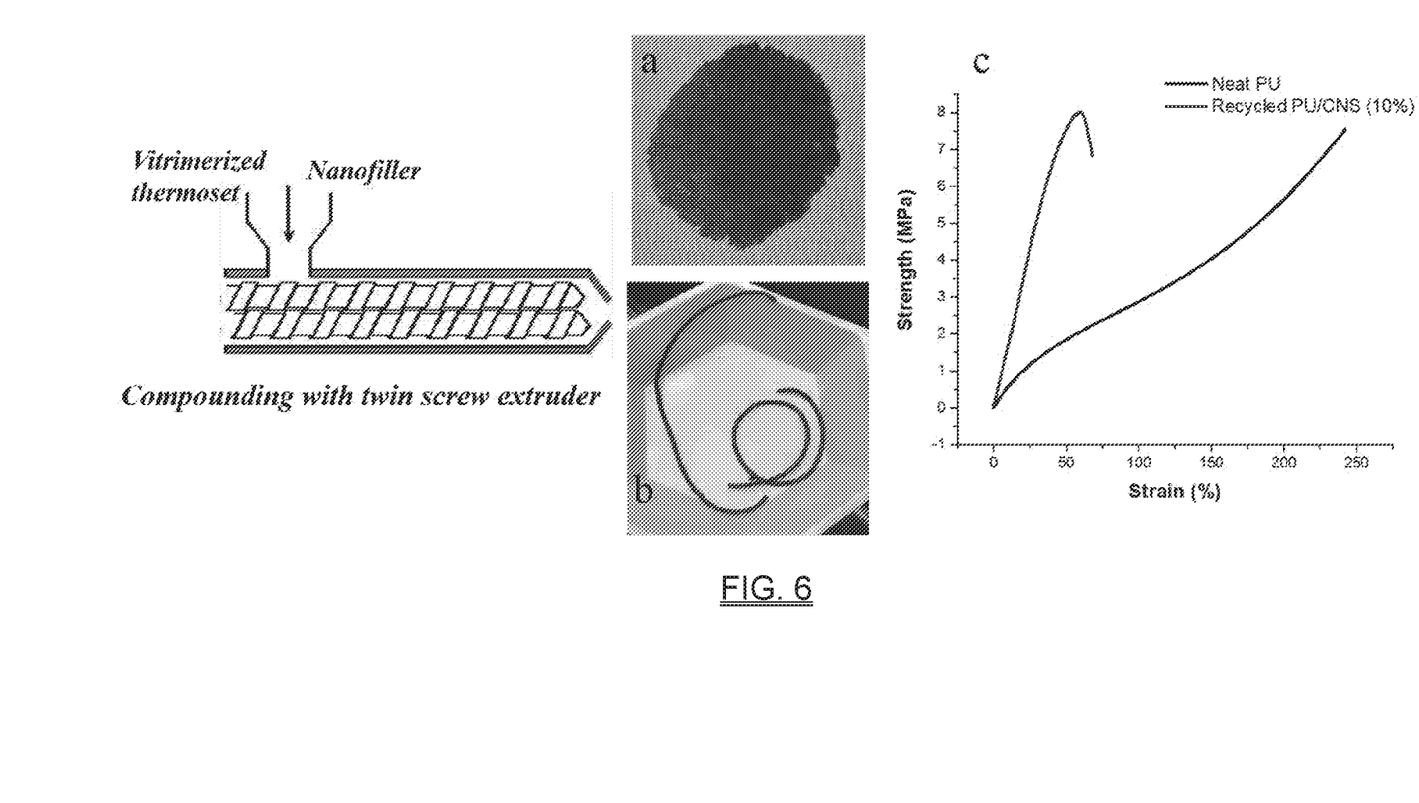
FIG. 6 illustrates (a) vitrimerized PU with 10 wt % CNS hot pressed into a thin film (b) vitrimerized PU with 10 wt % CNS extruded into strands and (c) representative tensile curves of neat and recycled PU/CNS systems.

Nanoparticle-Containing Example 10 wt % of highly branched carbon nanotubes with a diameter of 7-9 nm known as Carbon Nanostructures (CNS) were extruded along with the vitrimerized PU samples with the same parameters mentioned above and tested for mechanical properties as can be seen in FIG. 6(c). The nanocomposite exhibited brittle behavior showing an equivalent ultimate tensile strength to that of the neat sample and a modulus that was ~2.5 times higher.

We have clearly shown that PU and epoxy thermoset materials, previously thought to be waste and a burden to the environment past their intended use can be recycled and reprocessed once more via the vitrimerization process. Conventional processing techniques of compression molding, extrusion and injection molding have been described herein. We have further shown that during the reprocessing, incorporation of suitable fillers like Carbon Nanostructures (CNS) may significantly improve the properties to resemble or even surpass those of the original material. We have taken advantage of the transesterification chemistry for dynamic bonding. With the right catalyst or a combination of different catalysts, this work can be extended to other vitrimer chemistries.

Formation of thin films has been illustrated herewith. Other processing methods including extrusion, injection molding, and 3-D printing can be utilized as well.

In accordance with the patent statutes, the best mode and preferred embodiment have been set forth; the scope of the invention is not limited thereto, but rather by the scope of the attached claims.

What is claimed is:

1. A recycled and vitrimerized composition, comprising:
   a crosslinked polymer,
   a filler, and
   a catalyst dissolved within a liquid solvent to form a solution comprising between 10 to 20 wt. % of catalyst, wherein the solution is infused in a network comprising the crosslinked polymer so as to swell the composition and form a dynamic network and wherein the filler is between 1 to 30 wt. % of the composition.

2. The composition according to claim 1, wherein the crosslinked polymer comprises polyurethane, and wherein the catalyst comprises tin(II) 2-ethylhexanoate.

3. The composition according to claim 2, wherein the polyurethane is derived from a composition comprising polycaprolactone triol and 1,4-phenylene diisocyanate.

4. The composition according to claim 1, wherein the crosslinked polymer comprises epoxy and a curing agent.

5. The composition according to claim 4, wherein the epoxy comprises diglycidyl ether of Bisphenol-A and the curing agent comprises a fatty acid.

6. The composition according to claim 5, wherein the catalyst comprises tin(II) 2-ethylhexanoate or zinc acetylacetonate.

7. The composition according to claim 1, wherein the filler composition further includes nanoparticles.

8. The composition according to claim 7, wherein the nanoparticles comprise carbon nanotubes.

9. The composition according to claim 1 wherein the liquid solvent is at least one selected from the group consisting of: dichloromethane (DCM), Tetrahydrofuran (THF), N,N-Dimethylformamide (DMF), and Dimethylsulfoxide (DMSO).

* * * * *